United States Patent [19]
Hunter, Jr. et al.

[11] Patent Number: 5,971,877
[45] Date of Patent: Oct. 26, 1999

[54] VARIABLE TRANSMISSION

[76] Inventors: Harold A. Hunter, Jr., 336 W. Oakdale St., Mt. Airy, N.C. 27030; Charles Hunter, 290 C Five Acres Dr., Kernersville, N.C. 27284

[21] Appl. No.: 08/967,453

[22] Filed: Nov. 11, 1997

[51] Int. Cl.[6] ........................................... F16H 9/24
[52] U.S. Cl. .................. 474/69; 474/71; 74/63; 74/117; 74/594.1; 74/594.2; 192/43.1; 192/64
[58] Field of Search ................. 74/63, 500.5, 501.5 R, 74/502.2, 575, 577 M, 594.1, 594.2; 192/42.1, 64; 474/69, 71

[56] References Cited

U.S. PATENT DOCUMENTS

| | | | |
|---|---|---|---|
| 4,697,469 | 10/1987 | Takamiya et al. | 74/594.1 |
| 4,916,974 | 4/1990 | Kozakae et al. | 192/64 |
| 5,354,240 | 10/1994 | Hunter, Jr. | 474/69 |
| 5,454,766 | 10/1995 | Mills | 74/117 |

Primary Examiner—Tamara L. Graysay
Assistant Examiner—Chong H. Kim

[57] ABSTRACT

A power transmission system used in connection with a vehicle power wheel of a bicycle or other vehicle which has a fixed axle and which utilizes a rotating chain sprocket engaging an endless chain for receiving an input torque and transmitting an output torque. The system includes a transmission ratio varying apparatus that is operably connected to the wheel by the endless chain. The transition ratio apparatus incorporates a drive collar fixedly secured to a sprocket and having one or more input and output drive rings. A drive body is displaceable with respect to the input and output drive rings and includes input and output pawls pivotally connected to the drive body and engageable with the input and output drive rings. A shifter housing is moveable with respect to the fixed axle cam to rotatably shift the drive body with respect to the drive ring and change the relationship between the input and output pawls and thereby vary the torque transmission ratio. An operator lever and a cable connecting the operator lever with the shifter collar functions to move the shifter housing with respect to the fixed axle cam.

9 Claims, 6 Drawing Sheets

VARIABLE TRANSMISSION

BACKGROUND OF THE INVENTION

1. Field of the Invention

The present invention relates to a power transmission system and, more particularly, to a system wherein input and output pawls are utilized to be driven by an input drive ring and drive an output drive ring through a plurality of different torque transmission ratios.

2. Description of the Prior Art

A variety of variable transmission systems having pulleys with varying diameters are known such as those shown in U.S. Pat. No. 1,626,701 (Sleeper) and U.S. Pat. No. 1,279,271 (Sock1). These devices contain variable pulleys associated with belt drive power transmission systems. Another type of system is shown in U.S. Pat. No. 3,956,944 which discloses a variable ratio chain sprocket where a plurality of chain engaging segments are slidably affixed first between a pair of discs and are constrained to move in a radial direction with respect thereto. There are, however, variables in this type of construction that make it difficult to precisely adjust the transmission and to avoid excessive wear. More recently, a system shown in U.S. Pat. No. 5,354,240 covers a variable transmission system utilizing in one embodiment a shifter device with a stationary shifter ring, a moveable shifter plate, and an appropriate control mechanism for selectively displacing the shifter plate with respect to the shifter ring and sprocket. While this patented device reflects a relatively new approach to variable speed transmission systems, there is a limitation with respect to the range within which the torque transmission ratio can vary.

Thus, there is a need to provide an even more efficient and greater variation in the torque transmission ratio range of such transmission system. It is to this need that the present application is directed.

SUMMARY AND OBJECTIVES OF THE INVENTION

The present invention is a new and improved power transmission system for bicycles and other vehicles utilizing a standard fixed axle and rotating chain sprocket engaging an endless chain that receives an input torque and transmits an output torque. The system includes a transmission ratio varying apparatus having a drive collar secured to the sprocket and at least one input drive ring and one output drive ring. A drive body is displaceable with respect to the input and output drive rings, and input and output pawls are pivotally connected to the drive body and engageable with the input and output drive ring. A shifter housing is moveable with respect to the fixed axle to rotatably shift the drive body with respect to the drive ring and change the relationship between the input and output pawls. Movement of the shifter housing to change the relationship between the input and output pawls changes the torque transmission ratio. The system is highly flexible and expandable to encompass a broad range of torque transmission ratios.

From the summary set forth above, it can be seen that a primary objective of the present invention is to provide a new and improved power transmission system for bicycles and other vehicles which has all of the advantages of prior art assemblies and none of the disadvantages.

It is another objective of the present invention to provide a new and improved power transmission system of the type described which utilizes input and output pawls that experience a changing relationship with each other to be driven by the input drive ring and drive the output drive ring and thereby vary the torque transmission ratio accordingly.

Yet still another objective of the present invention is to provide a new and improved power transmission system of the type described which is capable of being retrofitted to existing rear axles of the majority of standard size bicycles.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, it is to be understood that the invention is not limited in its application to the details of construction and to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting. Those skilled in the art will appreciate that the concept upon which this disclosure is based may be readily utilized as a basis for the designing of other structures, methods and systems for carrying out the several purposes of the present invention. It is important, therefore, that the claims be regarded as including equivalent constructions insofar as they do not depart from the spirit and scope of the present invention.

Thus, the enumerated objectives and others identified hereinafter, along with the various features of novelty which characterize the invention, are pointed out with particularity in the claims annexed hereto and forming a part of this disclosure. For a better understanding of the invention, its operating advantages and the specific objectives attained by its use, reference is made to the accompanying drawings forming a part of the specification in which like characters of reference designate like parts throughout the several views.

DETAILED DESCRIPTION OF THE PREFERRED EMBODIMENT

The present invention utilizes a series of gear trains that are added together to obtain a desired ratio range for the transmission. While any number of gear trains may be used, an example incorporating four gear trains within the hub will be depicted herein and described in detail in this specification. It is to be understood that the invention can employ any number of gear trains added together to increase the ratio range as desired.

Figure 1:
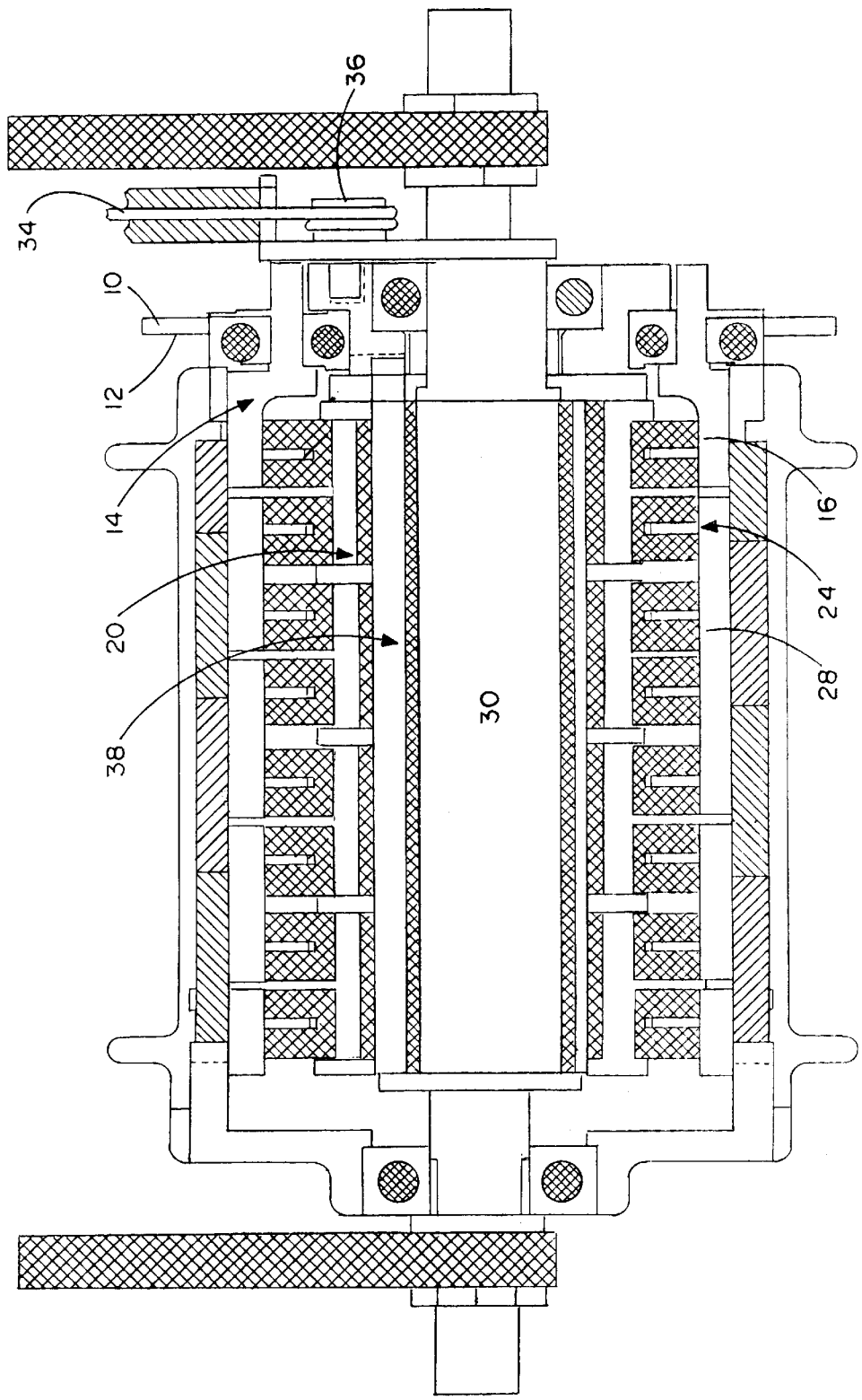
FIG. 1 is a side elevational, sectional and schematic view of the power transmission system comprising the present invention showing the operating cable secured to the shifter collar, the input and output drive rings, and the fixed axle supported by the drop out fork of the wheel support mechanism.
Figure 2:
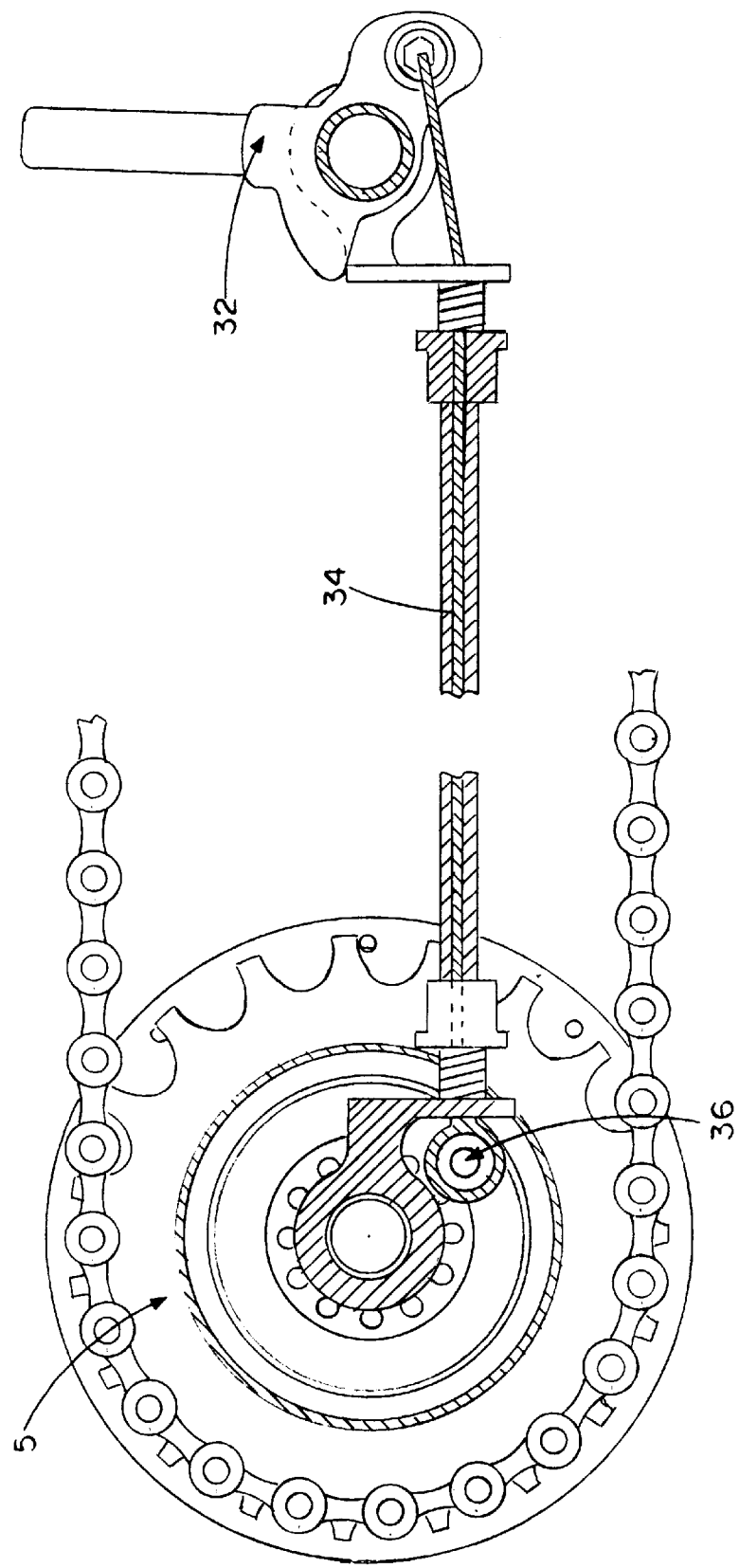
FIG. 2 is a side elevational, fragmented, enlarged and schematic view of the operating lever and the shifter collar connected by the cable and the endless chain operably connected to the sprocket.
Figure 3:
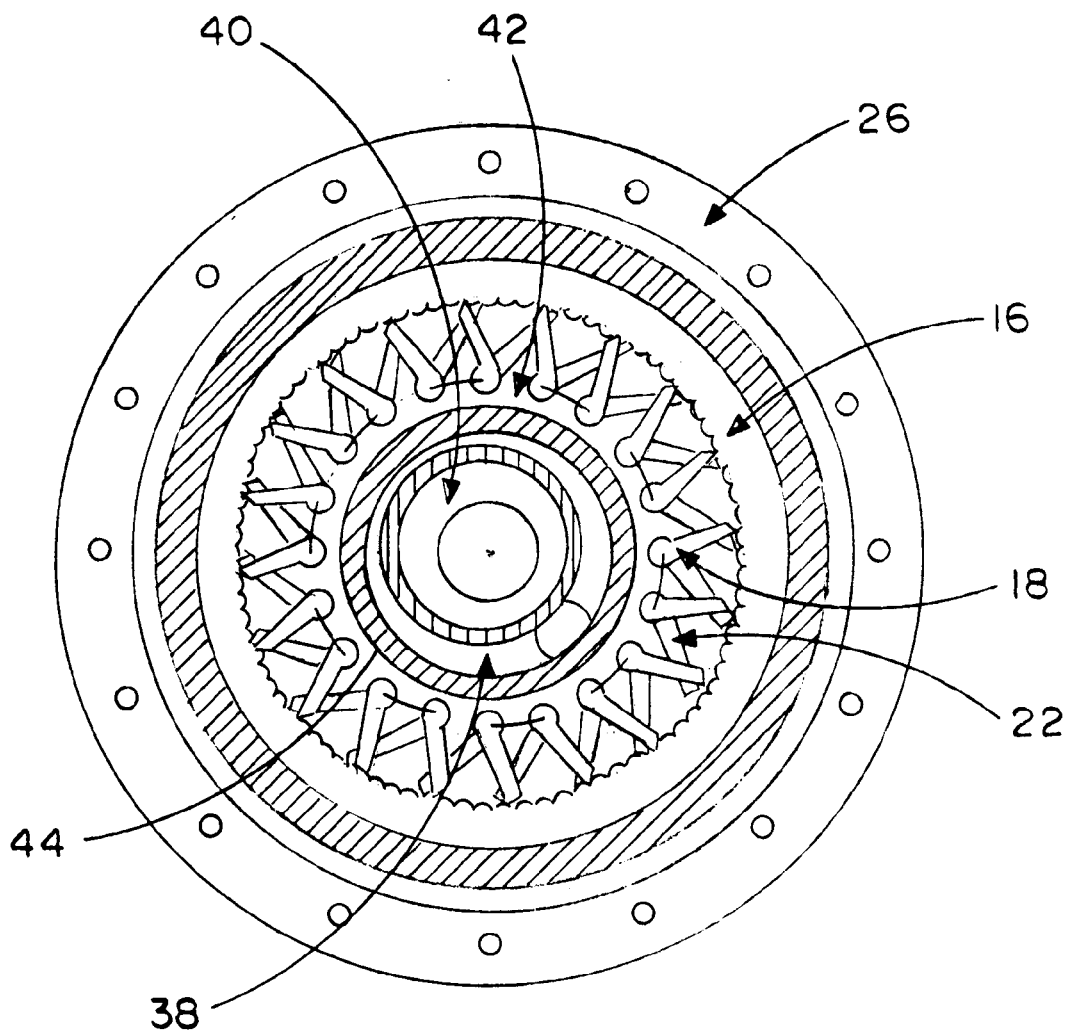
FIG. 3 is a side elevational, sectional and schematic view of the hub, the input drive ring, the shifter houser, the axle cam, the drive body and the input and output pawls when the torque transmission ratio of the power transmission system is 1:1.
Figure 4:
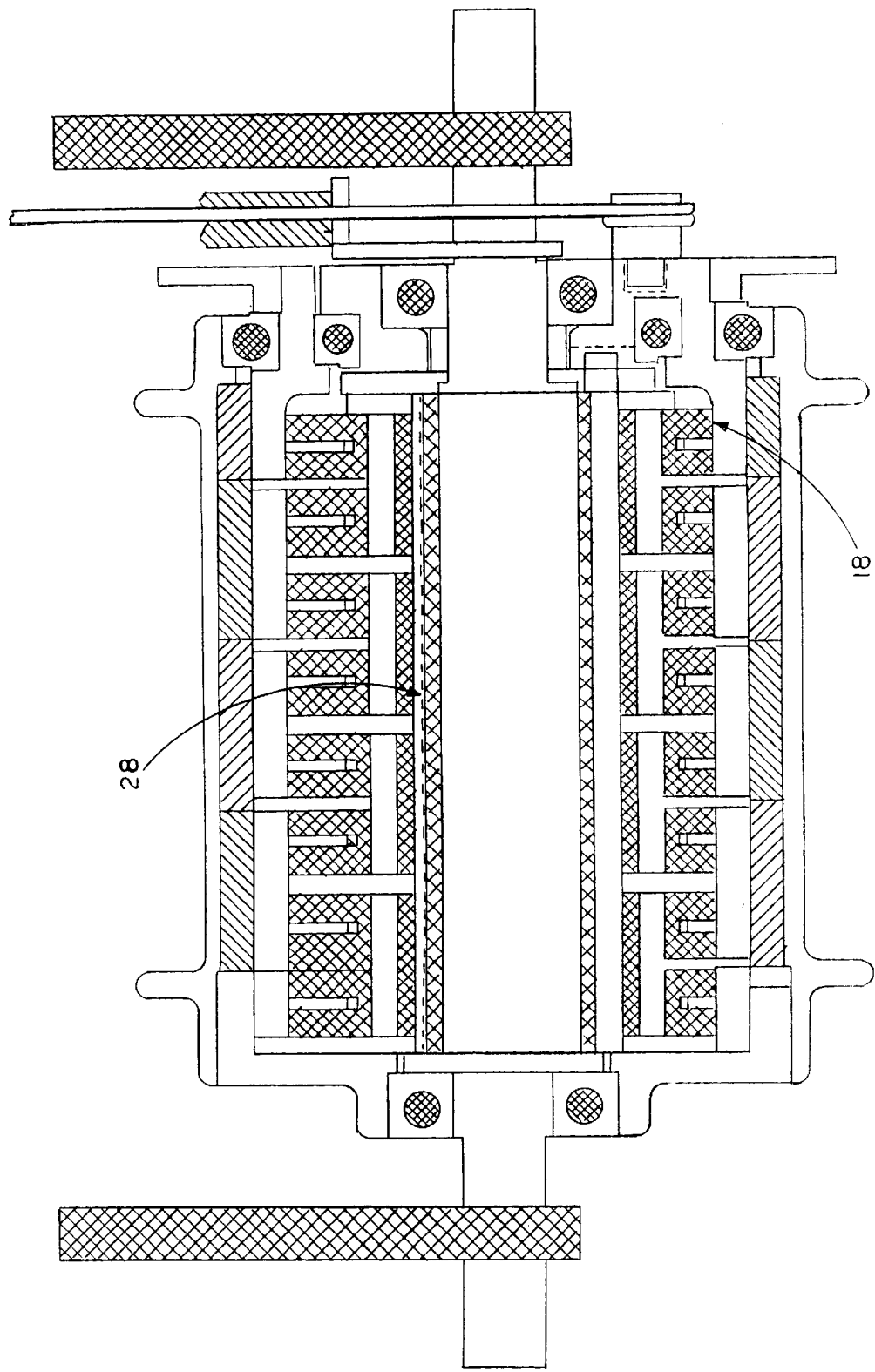
FIG. 4 is the power transmission system shown in FIG. 1 when the torque transmission ratio is 1:2.4.
Figure 5:
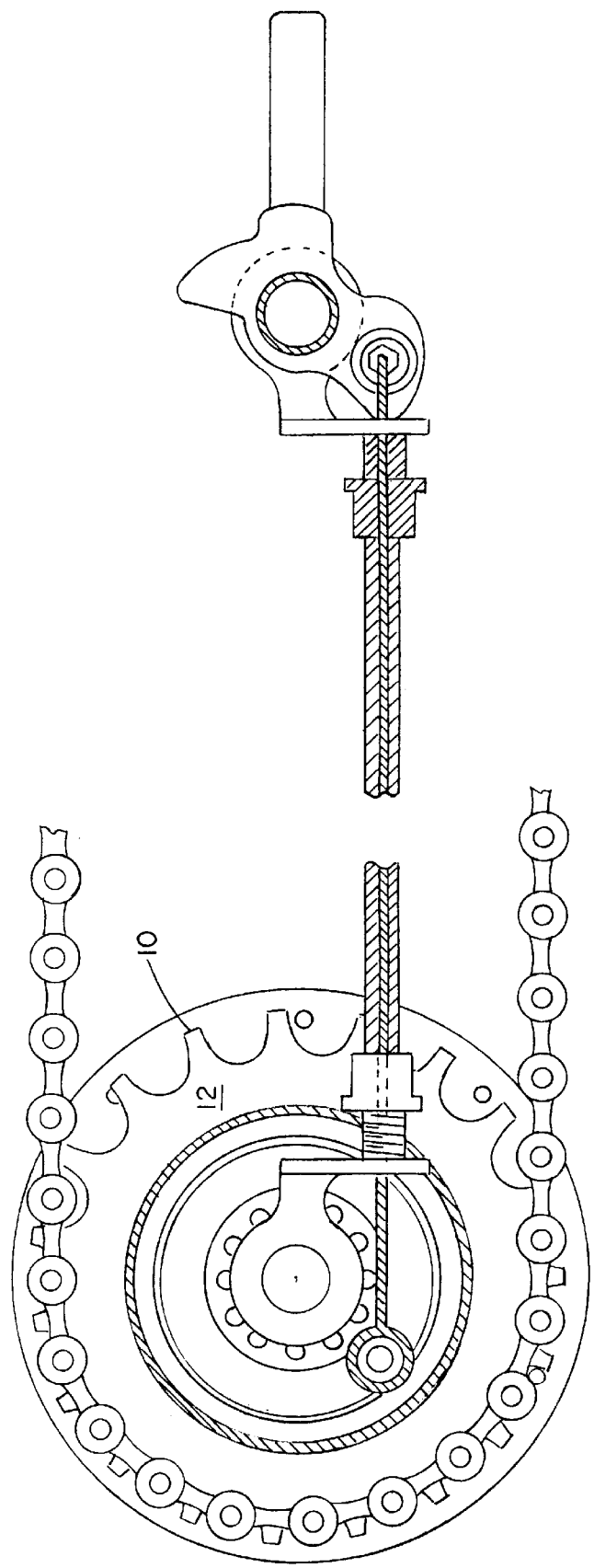
FIG. 5 is the power transmission shown in FIG. 2 when the torque transmission ratio is 1:2.4.
Figure 6:
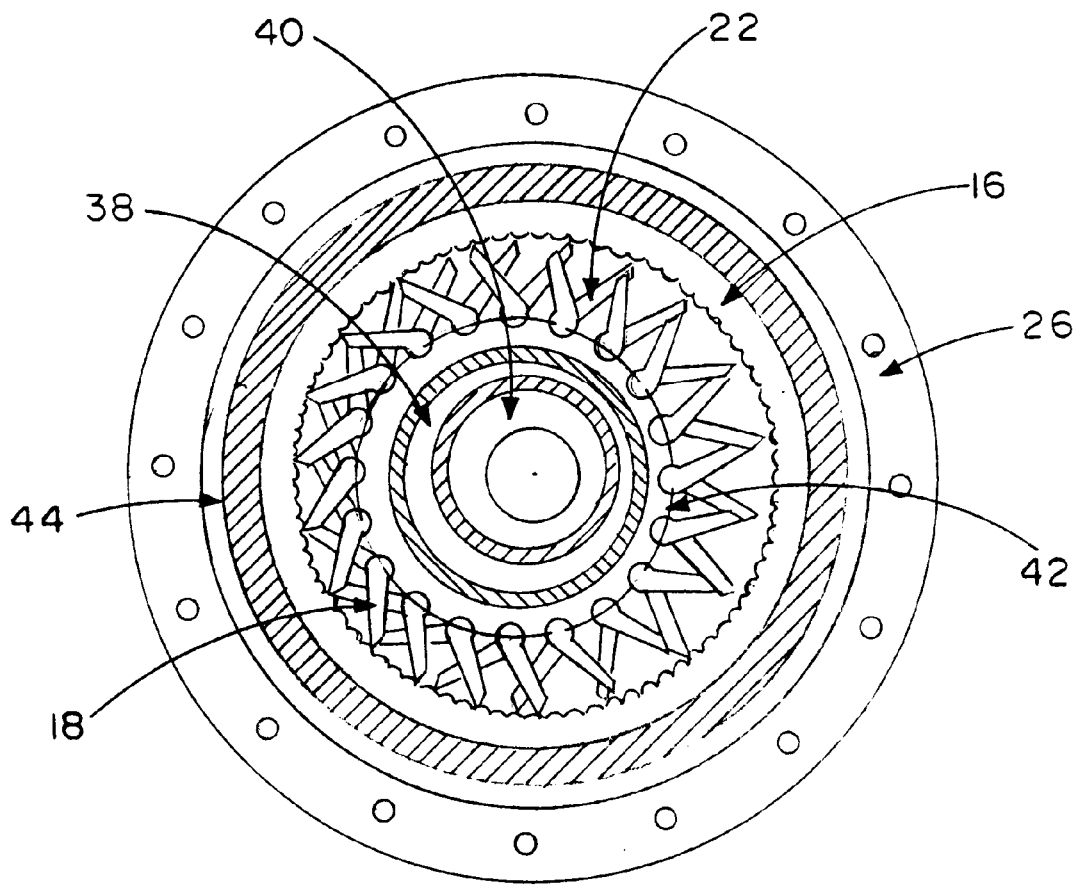
FIG. 6 is the power transmission shown in FIG. 3 when the torque transmission ratio is 1:2.4.

Referring now to the drawings and particularly to FIG. 1, a cog 10 of a sprocket 12 is fixedly secured to a drive collar 14. Drive collar 14 contains a first drive ring 16 including an array of teeth on the inside diameter which drives input pawl 18 (FIG. 3) as shown. Input pawl 18 drives a drive body 42 which, in turn, drives an output pawl 22 which in turn drives an output drive ring 24. Input and output drive rings 16, 24, together with their associated pawls 18, 22 provides the first of a series of gear trains which continue until output drive ring 24 is rigidly secured in hub 26.

To describe the apparatus more particularly, a gear train consists of an input drive ring 16, drive input pawl 18, which drives output pawl 22 which drives output drive ring 24. Output drive ring 24 is fixedly secured to the next input drive ring 28 through a rigid connection 30 which drives the next train. The series of trains continues until the output drive ring is secured in hub 26. As the series of trains are added, the overall ratio of the transmission is building exponentially. For example, if one train is capable of generating 125% of range, then four trains can generate 125% to the fourth power ($125^4$).

Shifting the transmission system is done by positioning a lever 32 which moves a cable 34 that is secured to shifter collar 36. Shifter collar 36, when displaced by lever 32 and cable 34, rotates the shifter housing 38 about axle cam 40. The series of drive bodies 20 are mounted with bearings 44 on the outside diameter of shifter housing 38. When shifter housing 38 is rotated, drive bodies 42 with pawls 18, 22 are offset as well. This change in radius that drive bodies 42 and pawls 18, 22 have relative to input and output drive rings 16, 24 causes the angular velocity of output drive rings 24 to be greater than that of input drive rings 16. The greater the offset of shifter housing 38, drive body 42 and pawls 18, 22, the greater the range of the transmission ratio.

The power transmission system comprising the present invention is extremely efficient and, depending upon the number of trains, minimizes wear on the components of the system. The number of trains capable of being used is from a minimum of one to an infinite number.

The power transmission system comprising the present invention has been illustrated and described in operable form. It is to be realized that optimum dimensional relationships for the parts of the invention to include variations in size, materials, shape, form, function and manner of operation, assembly and use are deemed readily apparent and obvious to one skilled in the art. All equivalent relationships to those illustrated in the drawings and described in the specification are intended to be encompassed herein. The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A power transmission system comprising: a vehicle power wheel with a fixed axle; a rotatable chain sprocket; transmission ratio varying means; and a chain connecting the wheel with the transmission ratio varying means, the transmission ratio varying means including a drive collar fixedly secured to the sprocket and having a least one input drive ring and one output drive ring, a drive body displaceable with respect to at least one input drive ring and output drive ring, at least one input pawl pivotally connected to the drive body and engagable with the at least one input drive ring and at least one output pawl pivotally connected to the drive body and engagable with the at least one output drive ring respectively, and shifter housing movable with respect to the fixed axle to rotatably shift the drive body with respect to the input and output drive rings and change the relationship between the input and output pawls, and means to move the shifter housing with respect to the fixed axle to vary the torque transmission ratio.

2. The system as claimed in claim 1 wherein the at least one input drive ring and output drive ring have a plurality of pawl receiving teeth associated therewith.

3. The system as claimed in claim 1 wherein the shifter housing includes an operating lever and a cable connecting the operating lever with the shifter housing.

4. The system as claimed in claim in claim 1 wherein the transmission ratio varying means includes a plurality of input drive rings and output drive rings.

5. The system as claimed in claim 4 wherein each of the input drive rings and output drive rings include a plurality of input and output pawls.

6. The system as claimed in claim 1 wherein the input drive ring drives the input drive pawl, the input drive pawl drives the drive body, the drive body drives the output pawl, and the output pawl drives the output drive ring.

7. The system as claimed in claim 1 wherein the torque transmission ratio is selectively variable.

8. The claim as claimed in claim 1 wherein each input drive ring and each output drive ring comprises a drive train and each additional drive train enlarges the torque transmission ratio.

9. The system as claimed in claim 1 wherein each input drive ring and each output drive ring comprises a drive train and each drive train enlarges the torque transmission ratio so that the torque transmission ratio is selectively variable within a range of from 1:1 to 1:2.4.

* * * * *